Feb. 10, 1925.

E. ISRAEL

WHEEL CHOCK

Filed March 12, 1924

Inventor
Eli Israel.

By Lacey & Lacey, Attorneys

Patented Feb. 10, 1925.

1,525,742

UNITED STATES PATENT OFFICE.

ELI ISRAEL, OF WILKES-BARRE, PENNSYLVANIA.

WHEEL CHOCK.

Application filed March 12, 1924. Serial No. 698,684.

*To all whom it may concern:*

Be it known that I, ELI ISRAEL, a citizen of the United States, residing at Wilkes-Barre, in the county of Luzerne and State of Pennsylvania, have invented certain new and useful Improvements in Wheel Chocks, of which the following is a specification.

This invention relates to an improved wheel chock for motor vehicles and seeks, among other objects to provide a device of this character particularly adapted for use in the shipment of such vehicles from a factory to their point of destination.

The invention seeks, as a further object, to provide a device which may be compactly folded so that a number of the devices may be stacked in a comparatively small space for return to the factory.

And the invention seeks, as a still further object, to provide a device embodying means for holding the chock against slipping and wherein the device will be formed to accommodate fastening means so disposed that said fastening means may be readily withdrawn without injury to the device.

Other and incidental objects will appear hereinafter.

In the shipment of automobiles considerable difficulty is, as is well known, at present experienced in chocking the vehicles after having been placed on the cars. The practice usually followed is to spike blocks of wood behind the rear wheels and in front of the forward wheels. This involves considerable outlay for lumber since, after the vehicle has reached its destination, the blocks are not returned and, furthermore, the repeated spiking of blocks to the floor of any one car soon results in splitting and mutilation of the car floor. For such reason it often becomes difficult, after a car has been used several times in the shipment of motor vehicles, to securely spike blocks to the car floor which fact, of course, unavoidably involves considerable risk in the shipment of the vehicle. The present invention, therefore, seeks to provide a simple and cheap device which may be used over and over again and which, by necessitating the use of only a pair of spikes for securing the device to the floor of a car, will minimize injury to the car floor. Furthermore, the invention seeks to embody means whereby the spikes may be readily engaged to be withdrawn so as to thereby not only avoid injury to the device itself but also avoid a very prolific source of injury to the car.

Figure 2:
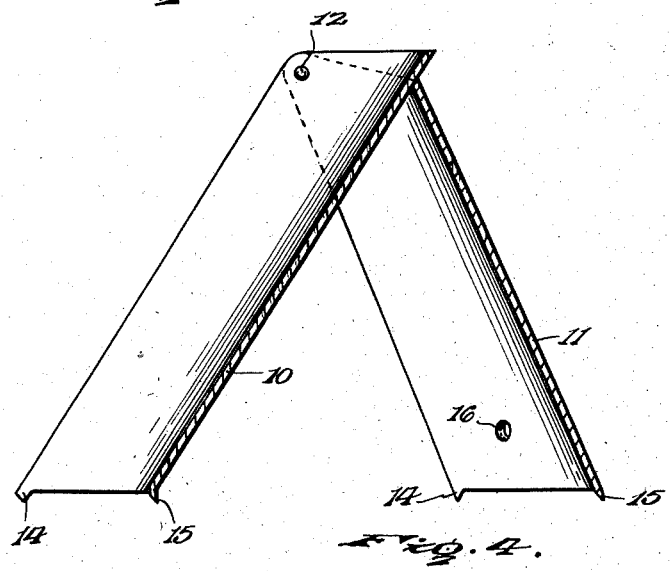
Figure 2 is a detail sectional view taken medially through the device.
Figure 3:
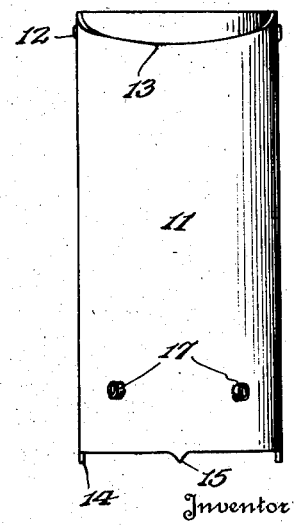
Figure 3 is an elevation of the device.

In accordance with the present invention, the improved chock is formed of complemental trough-shaped members 10 and 11 respectively. Each of these members is preferably formed from a single piece of suitable resilient sheet metal bent transversely into substantially concavo convex shape and extending through the sides of the members at their upper ends are rivets or other suitable fastening devices 12 pivotally connecting the members. At its upper end, the member 11 is cut away to form a curved edge 13 adapted to fit the member 10 so that when the members are swung apart, as shown in Figure 2 of the drawings, said members will be rigidly limited in diverging relation while, at their lower ends, both of the members are cut away to define spurs 14 at the lower corners of the members as well as medially disposed spurs 15. Formed through the member 11 near its lower end are spaced openings 16 located at opposite sides of the longitudinal center line of said member and preferably these openings are punched through from the inner side of the member to define raised annular lips 17 at the outer side of the member surrounding said openings.

Figure 1:
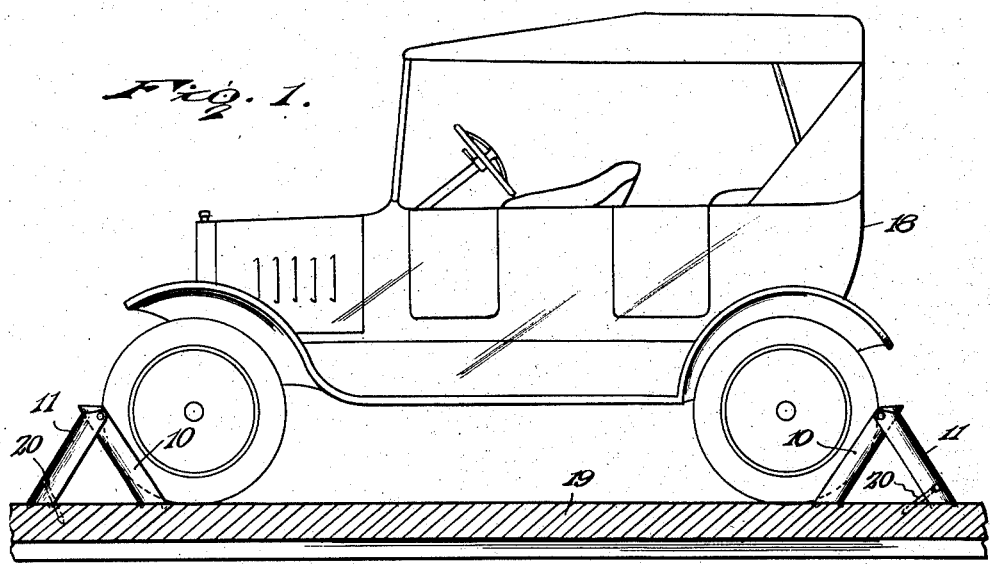
Figure 1 is a side elevation showing the manner in which my improved chock is used for securing a motor vehicle upon a car for transportation.
Figure 4:
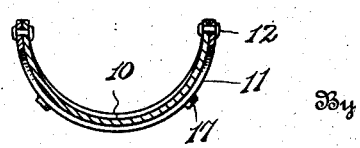
Figure 4 is a transverse sectional view showing the manner in which the device may be folded.

In Figure 1 of the drawings, I have shown the manner in which my improved chock is used in the transportation of motor vehicles, a motor vehicle being conventionally illustrated at 18 and the floor of an ordinary railway car at 19. As shown, the members 10 and 11 of the device are arranged in diverging relation when one of the chocks is positioned behind each rear wheel of the vehicle and, in like manner, one of the chocks is also positioned in front of each forward wheel of the vehicle so that the vehicle will be firmly held between the several chocks. The spurs 15 of the chocks will, of course, sink into the floor 19 of the car to prevent slipping of the chocks. However, to effectually prevent possible dislocation of the chocks, spikes 20 are inserted through the openings 16 of the members 11 and driven into the car floor for securely anchoring the chocks. Accordingly, the several chocks will cooperate to prevent forward and rear movement of the vehicle and since the members 10 are trough-shaped, said members will fit the vehicle tires in such manner that injury to the tires will be effectually avoided. After the vehicle has reached its destination, the spikes 20 are withdrawn for releasing the vehicle, when the members 10 and 11 of each chock may, as shown in Figure 4, be compactly folded into nested relation. Thus, a large number of the chocks may be packed in a comparatively small space for return to the factory. In this connection, particular attention is directed to the fact that the lips 17 of the members 11 will serve as spacing elements between the heads of the spikes and said members so that when it is desired to withdraw the spikes, a claw or the like may be readily inserted beneath the heads of the spikes. Injury to the chock, incident to withdrawal of the spikes, will thus be avoided, as well as injury to the car floor such as would be brought about by bending or hammering sidewise against the spikes.

Having thus described the invention, what I claim is:

1. A wheel chock including a pair of complemental swingingly connected trough-shaped members movable into divergent relation locked against each other as well as into nested relation lying flat against each other.

2. A wheel chock including a pair of complemental swingingly connected concavo-convex members movable into divergent relation locked against each other as well as into nested relation fitting flat against each other.

3. A wheel chock including a pair of complemental swingingly connected trough-shaped members movable into divergent relation locked against each other, as well as into nested relation lying flat against each other terminating substantially flush at their side edges.

4. A wheel chock including a pair of complemental swingingly connected trough-shaped members movable into divergent relation locked against each other, one of the members being provided near its lower end with openings to receive headed fastening devices anchoring the chock and being provided with lips for spacing the heads of said fastening devices away from said member.

5. A wheel chock including complemental swingingly connected trough-shaped members movable into divergent relation locked against each other and cut away at their lower ends to define spurs projecting beyond the lower end edges of the members, one of the members being provided with openings to receive headed fastening devices anchoring the chock and being formed with upstanding lips surrounding said openings for spacing the heads of said fastening devices away from the member.

In testimony whereof I affix my signature.

ELI ISRAEL. [L. S.]